US012736021B2

(12) United States Patent
Tanaka et al.

(10) Patent No.: US 12,736,021 B2
(45) Date of Patent: Sep. 15, 2026

(54) VEHICLE

(71) Applicant: YAMAHA HATSUDOKI KABUSHIKI KAISHA, Iwata (JP)

(72) Inventors: Tatsuya Tanaka, Shizuoka (JP); Masahiro Yoshida, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 299 days.

(21) Appl. No.: 18/622,617

(22) Filed: Mar. 29, 2024

(65) Prior Publication Data

US 2024/0328378 A1 Oct. 3, 2024

(30) Foreign Application Priority Data

Mar. 31, 2023 (JP) ................................ 2023-059548

(51) Int. Cl.
*F02M 35/16* (2006.01)

(52) U.S. Cl.
CPC ........ *F02M 35/161* (2013.01); *F02M 35/162* (2013.01)

(58) Field of Classification Search
CPC ...... F02M 35/161; F02M 35/162; B62K 5/00; B62K 5/01; B60Y 2410/114
See application file for complete search history.

(56) References Cited

U.S. PATENT DOCUMENTS

| | | | | |
|---|---|---|---|---|
| 6,786,290 | B2 * | 9/2004 | Kuji | B62K 5/01 180/908 |
| 7,311,170 | B2 * | 12/2007 | Isoda | B60K 13/04 180/68.5 |
| 7,819,428 | B2 | 10/2010 | Tsuruta et al. | |
| 8,205,698 | B2 * | 6/2012 | Beloy | F02M 35/162 180/68.1 |

(Continued)

FOREIGN PATENT DOCUMENTS

JP 2007-230537 A 9/2007

OTHER PUBLICATIONS

Kensuke Kamada; Tatsuya Tanaka. Vehicle. Yamaha Hatsudoki Kabushiki Kaisha. U.S. Appl. No. 18/622,499, filed Mar. 29, 2024.

(Continued)

*Primary Examiner* — James A Shriver, II
*Assistant Examiner* — Mohammad Omid Neyzari
(74) *Attorney, Agent, or Firm* — Rabin & Berdo, P.C.

(57) ABSTRACT

A vehicle includes: a pair of front wheel; a pair of rear wheels; a saddle-style seat positioned at an intermediate region in a width direction of the vehicle; a steering shaft positioned ahead of the seat; a radiator positioned more forward than the steering shaft; an air intake portion having an air intake port, which is positioned more rearward than the steering shaft; a drive shaft provided at a lower position than the steering shaft and extending in a fore-aft direction; a windshield plate extending in the width direction of the vehicle for separating a radiator region and an air intake port (Continued)

region; and a pair of fenders provided respectively behind the pair of front wheels and connected by the windshield plate. The windshield plate has a first through-hole and a second through-hole through which the steering shaft and the drive shaft respectively penetrate.

6 Claims, 16 Drawing Sheets

(56) References Cited

U.S. PATENT DOCUMENTS

| | | | | |
|---|---|---|---|---|
| 2006/0219221 | A1* | 10/2006 | Tsuruta | B62K 5/01 180/219 |
| 2006/0288975 | A1* | 12/2006 | Hanafusa | F02B 61/02 123/195 C |
| 2007/0245985 | A1* | 10/2007 | Frijas | F01P 11/10 123/41.31 |
| 2021/0155172 | A1* | 5/2021 | Maeda | B60G 3/20 |

OTHER PUBLICATIONS

Masahiro Yoshida. Vehicle. Yamaha Hatsudoki Kabushiki Kaisha. U.S. Appl. No. 18/622,530, filed Mar. 29, 2024.
Masahiro Yoshida; Kohei Miyara. Vehicle. Yamaha Hatsudoki Kabushiki Kaisha. U.S. Appl. No. 18/622,457, filed Mar. 29, 2024.

* cited by examiner

10

A-A section

VEHICLE

CROSS-REFERENCE TO RELATED APPLICATIONS

The present application claims foreign priority to Japanese patent application number 2023-059548, filed on Mar. 31, 2023, the entire disclosure of which is hereby incorporated by reference herein.

BACKGROUND OF THE INVENTION

Field of the Invention

The present invention relates to vehicles, and more specifically to a straddled vehicle such as an ATV (All Terrain Vehicle).

Description of the Related Art

As an example of conventional techniques of this kind, U.S. Pat. No. 7,819,428 discloses a straddled vehicle provided by an ATV. In the vehicle, a radiator for cooling an engine is provided at a forward location of the engine.

Such a straddled vehicle has a problem that if the engine displacement is to be increased, the size of engine has to be increased and the radiator's cooling capacity has to be increased accordingly, resulting in increased temperatures of exhaust heat from the radiator. Also, as shown in U.S. Pat. No. 7,819,428, straddled vehicles generally have their radiators disposed at a front region of the vehicle, and this can raise an issue that exhaust heat from the radiator will affect intake air temperatures of the engine and/or of a continuously variable transmission located at a rear region. However, U.S. Pat. No. 7,819,428 discloses nothing about reducing the thermal effect on intake air temperatures caused by the exhaust heat from the radiator.

SUMMARY OF THE INVENTION

Therefore, a primary object of the present invention is to provide a vehicle capable of reducing thermal effect on intake air temperatures caused by exhaust heat from a radiator.

According to an aspect of the present invention, there is provided a vehicle which includes a pair of front wheels; a pair of rear wheels; a saddle-style seat provided at an intermediate region in a width direction of the vehicle; a steering shaft provided ahead of the seat; a radiator provided at a position more forward than the steering shaft; an air intake portion having an air intake port provided at a position more rearward than the steering shaft; and a windshield plate having a first through-hole for penetration by the steering shaft, and extending in a width direction of the vehicle for partitioning a radiator region and an air intake port region from each other.

In the present invention, the windshield plate penetrated by the steering shaft partitions the radiator region and the air intake port region from each other, whereby exhaust heat from the radiator which is located at a position more forward than the steering shaft is not transmitted to the air intake port which is located at a position more rearward than the steering shaft, and it is possible to reduce thermal effect on intake air temperatures caused by the exhaust heat from the radiator.

Preferably, the windshield plate is composed of a plurality of parts. In this case, it becomes easy to assemble the windshield plate, and also possible to assemble the windshield plate for improved air flow inside the air intake port region.

Further preferably, the vehicle further includes a pair of fenders provided behind the pair of front wheels and connected with each other by the windshield plate. In this case, by connecting the pair of fenders which are provided behind the pair of front wheels with each other using the windshield plate, it becomes possible to close a gap between the pair of fenders.

Further, preferably, the windshield plate is provided to cover above and behind the radiator. In this case, it becomes possible to further reduce the thermal effect caused by the exhaust heat from the radiator on intake air temperatures.

Preferably, the vehicle further includes a drive shaft provided at a lower position than the steering shaft and extending in a fore-aft direction, and the windshield plate further has a second through-hole for penetration by the drive shaft. In this case, it is possible, with the windshield plate, to partition the radiator region and the air intake port region from each other all the way down to below the drive shaft, and therefore it is possible to further reduce thermal effect on the intake air temperatures caused by the exhaust heat from the radiator.

Further preferably, the vehicle further includes a prime mover supplied with air from the air intake portion. In this case, it becomes possible, with the windshield plate, to reduce the thermal effect caused by the exhaust heat from the radiator on intake air temperatures of the prime mover.

Further, preferably, the vehicle further includes a continuously variable transmission supplied with air from the air intake portion. In this case, it is possible, with the windshield plate, to reduce thermal effect caused by the exhaust heat from the radiator on intake air temperatures of the continuously variable transmission.

The above-described object and other objects, characteristics, aspects and advantages of the present invention will become clearer from the following detailed description of embodiments of the present invention to be made with reference to the attached drawings.

DETAILED DESCRIPTION OF THE PREFERRED EMBODIMENTS

Figure 1:
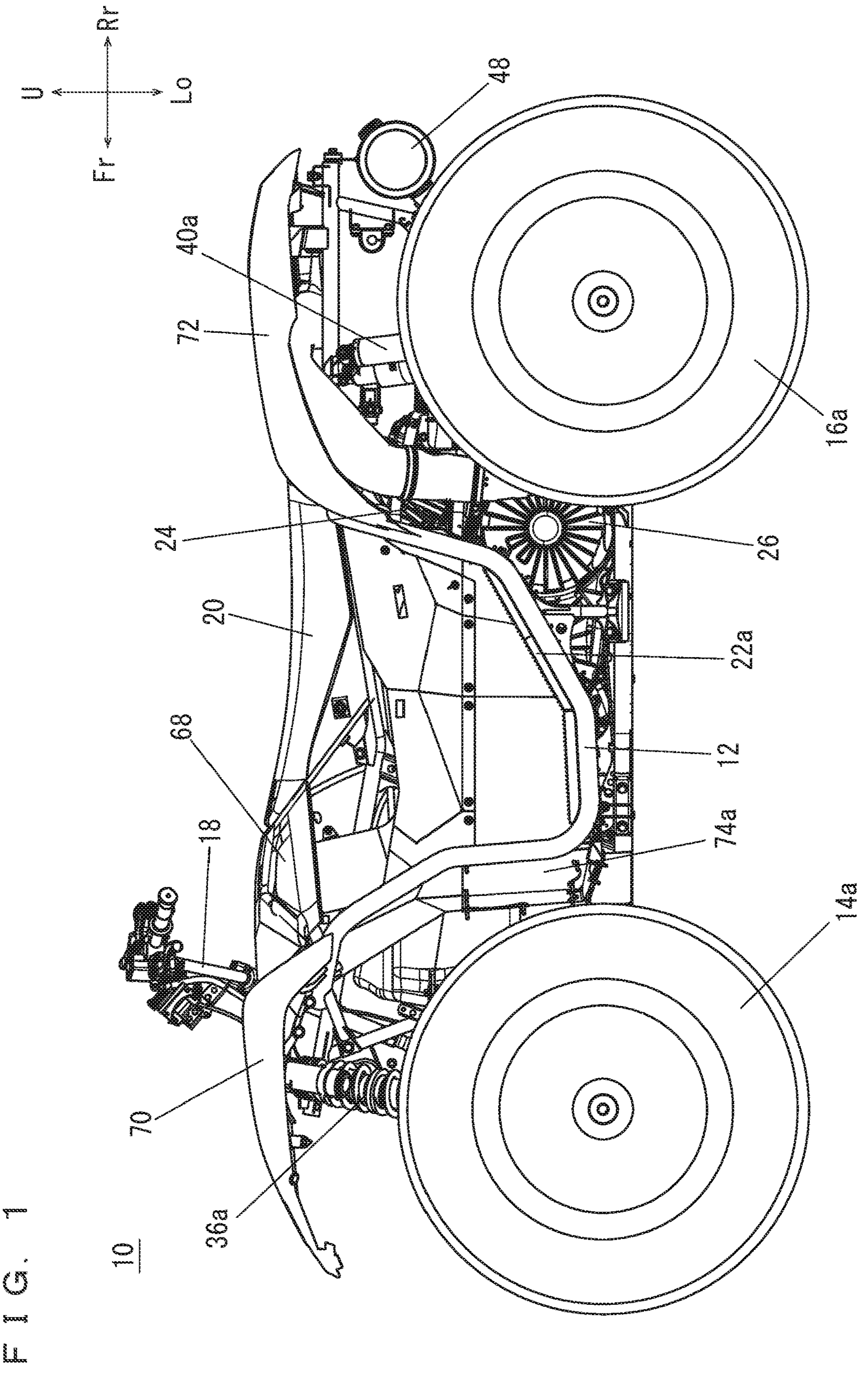
FIG. 1 is a side view which shows a vehicle according to an embodiment of the present invention.
Figure 2:
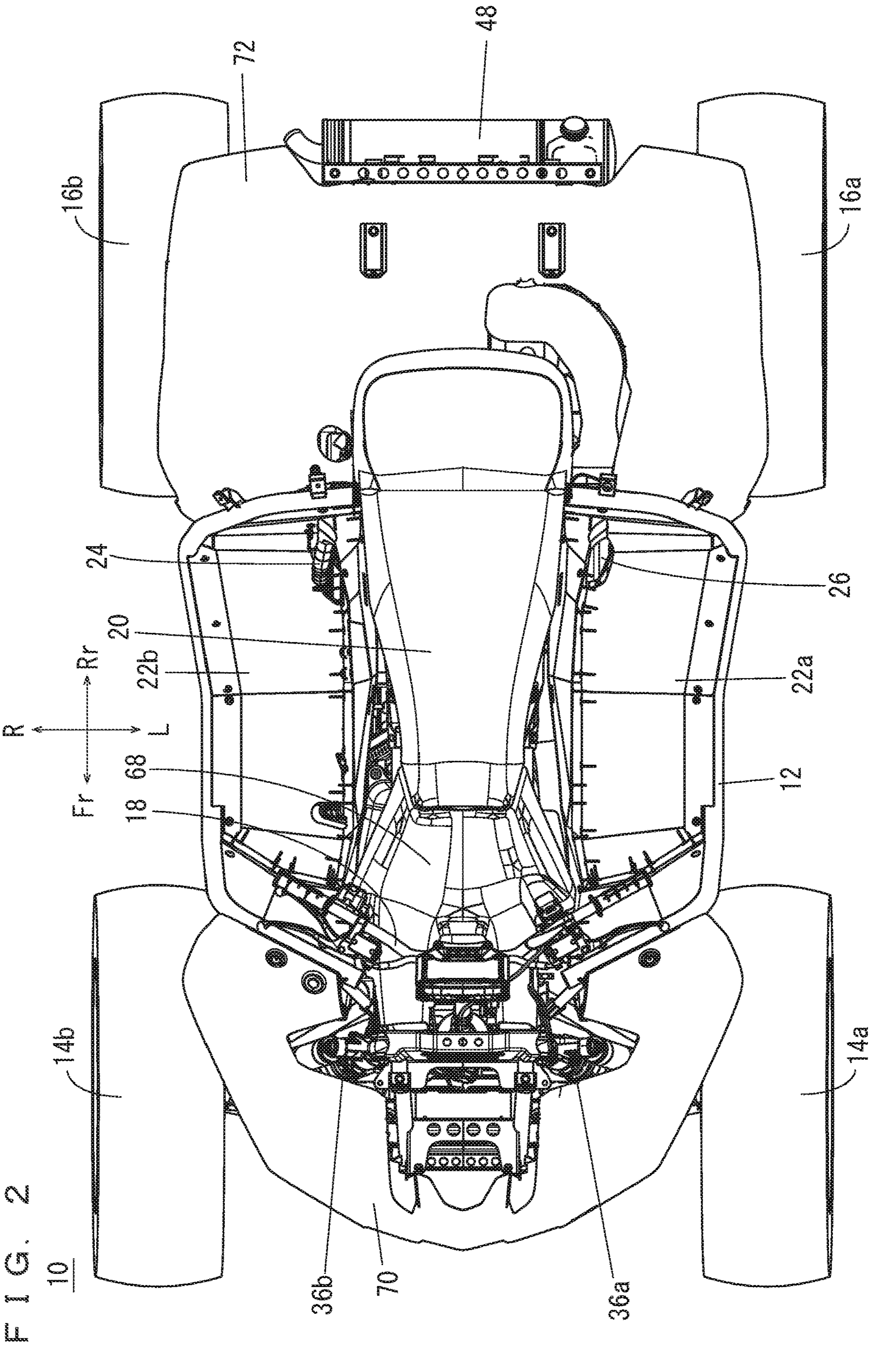
FIG. 2 is a plan view which shows the vehicle in FIG. 1.
Figure 3:
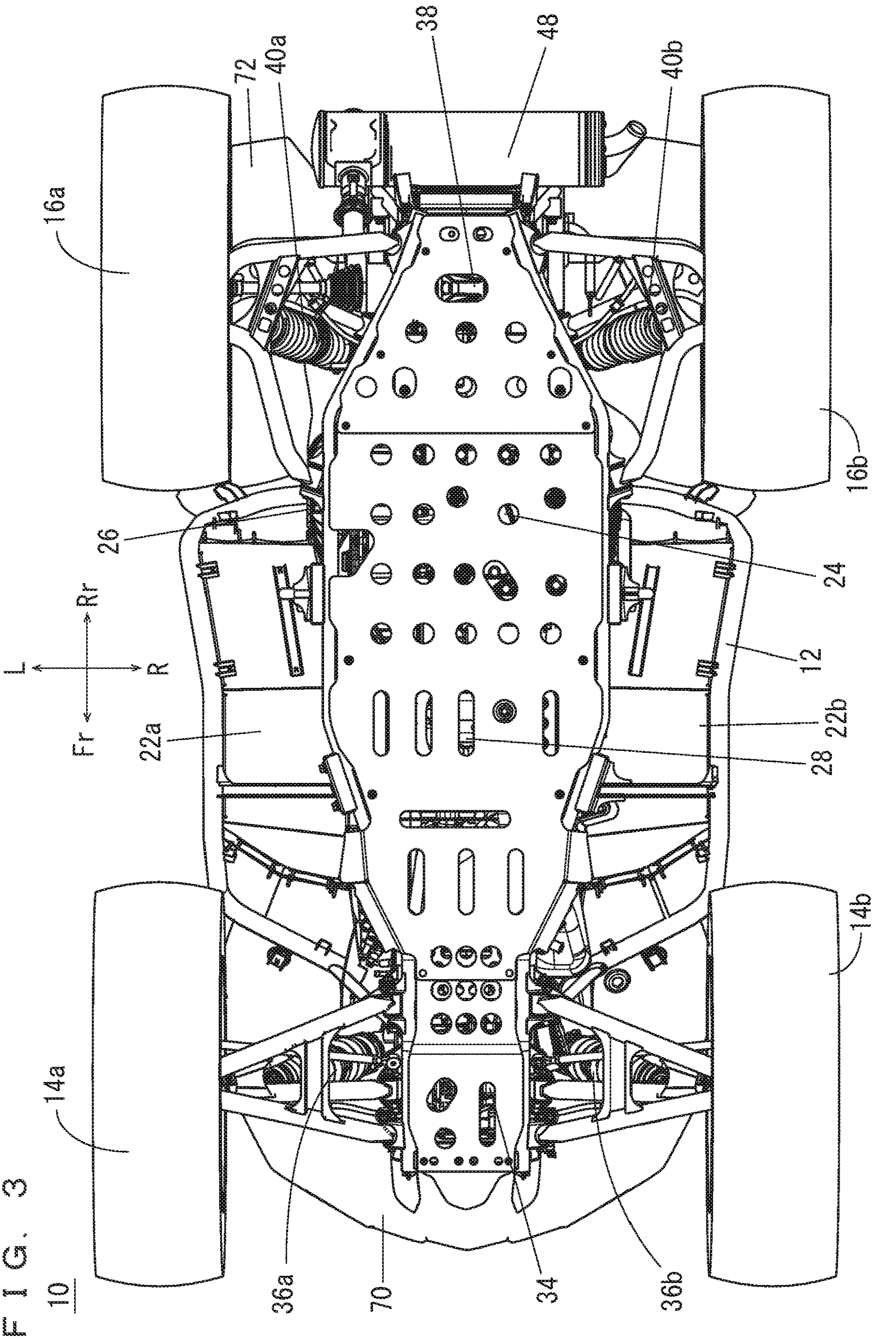
FIG. 3 is a bottom view which shows the vehicle in FIG. 1.
Figure 4:
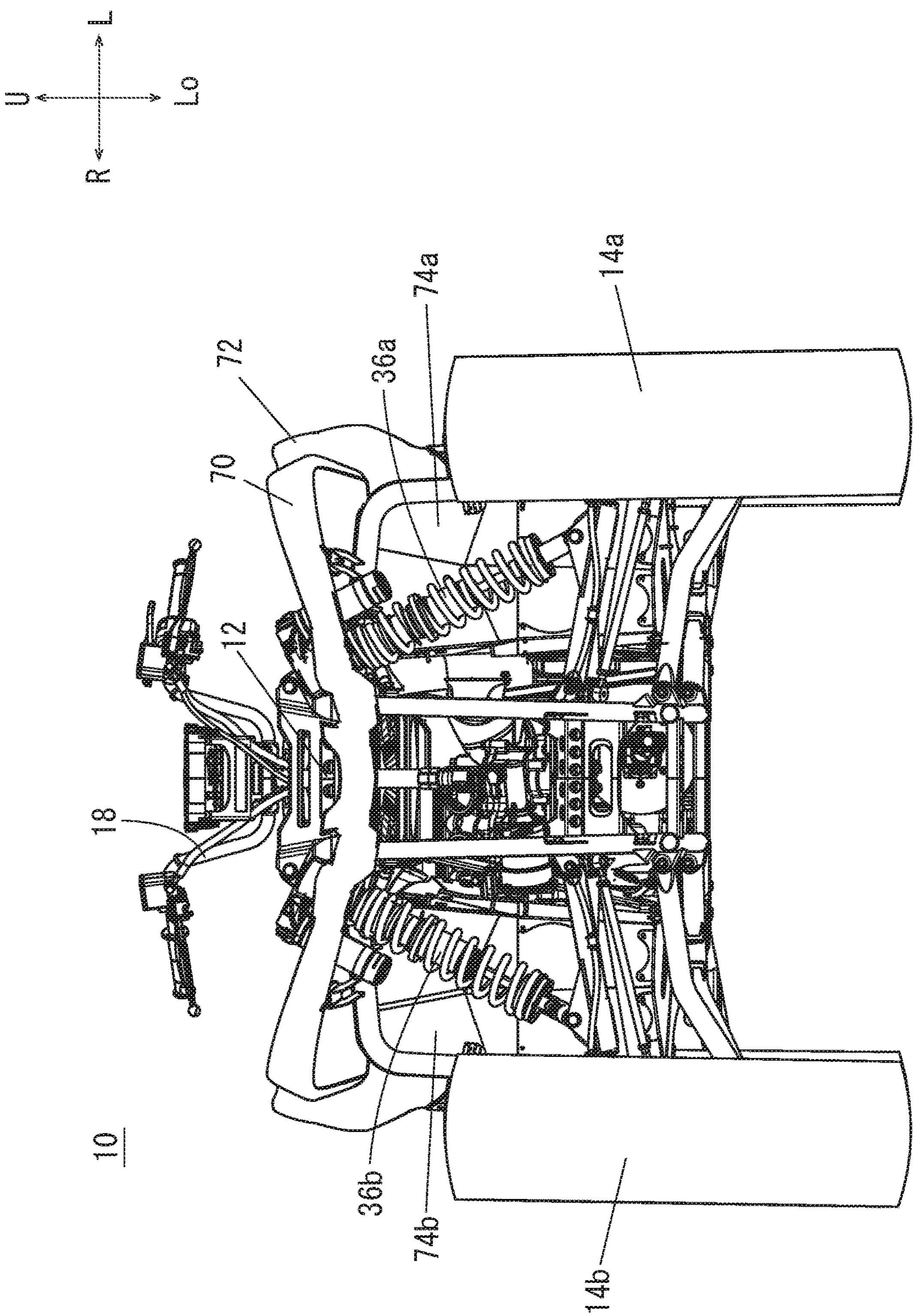
FIG. 4 is a front view which shows the vehicle in FIG. 1.
Figure 5:
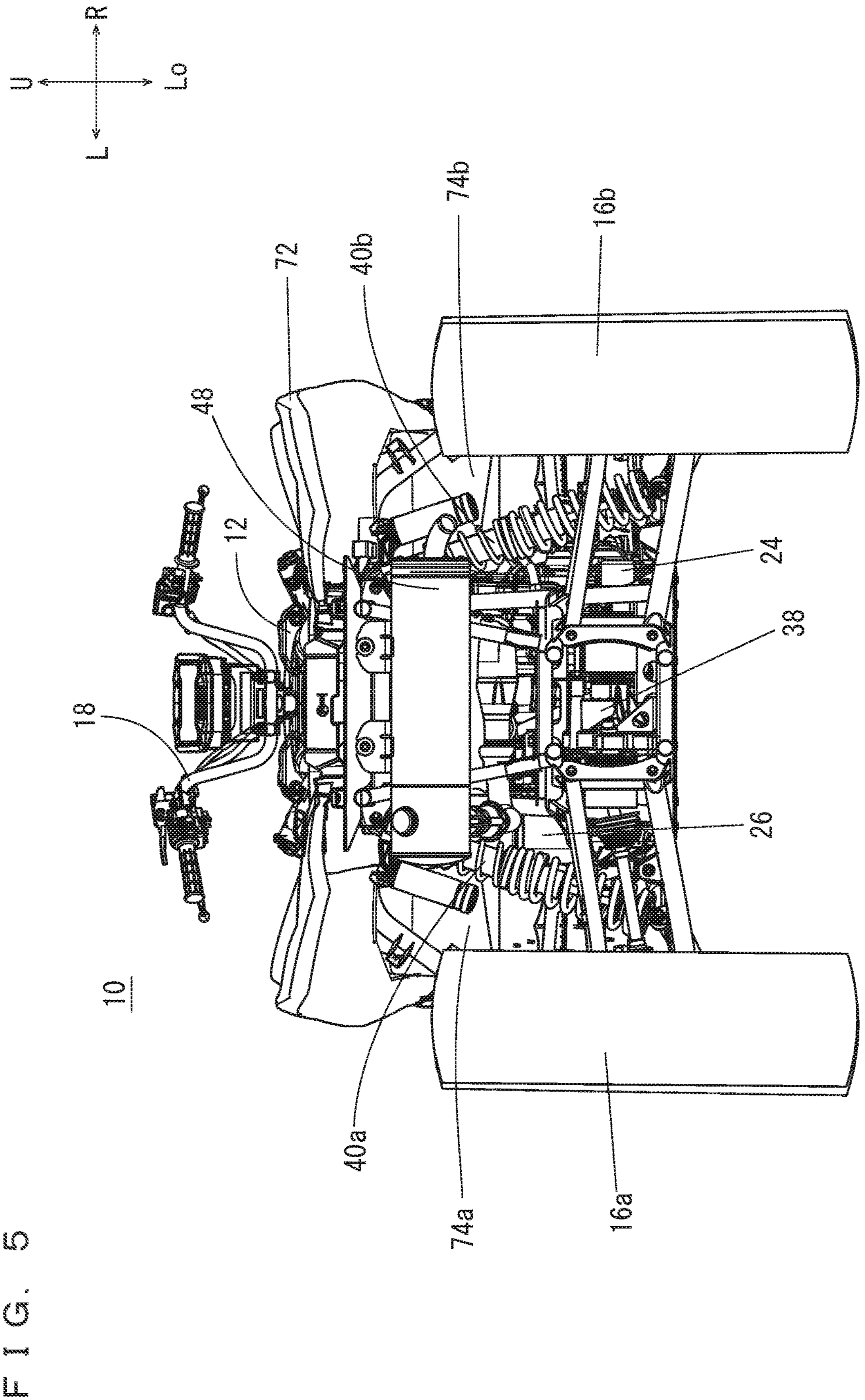
FIG. 5 is a rear view which shows the vehicle in FIG. 1.
Figure 6:
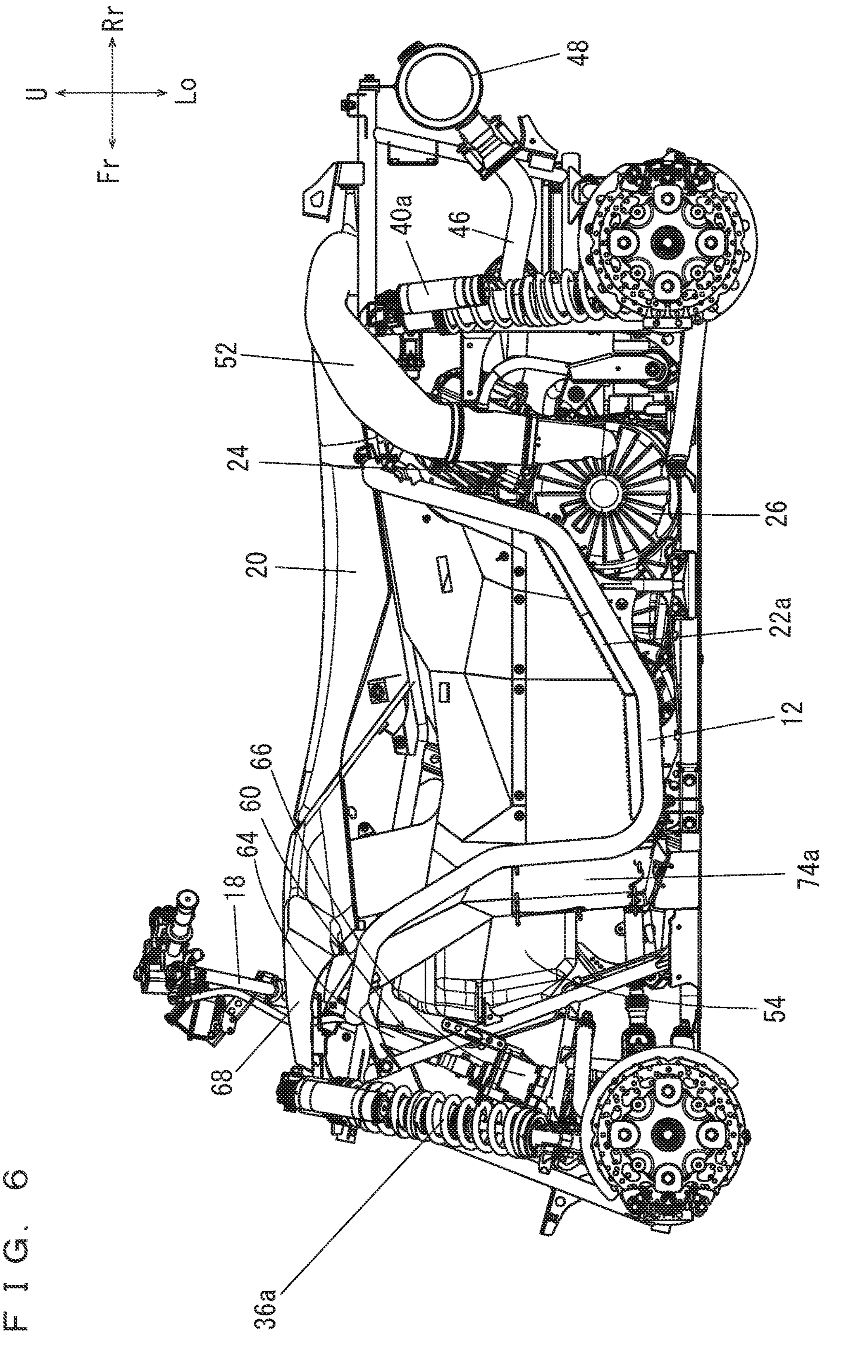
FIG. 6 is a side view which shows a state where wheels, a front fender, etc. are removed from the vehicle in FIG. 1.
Figure 7:
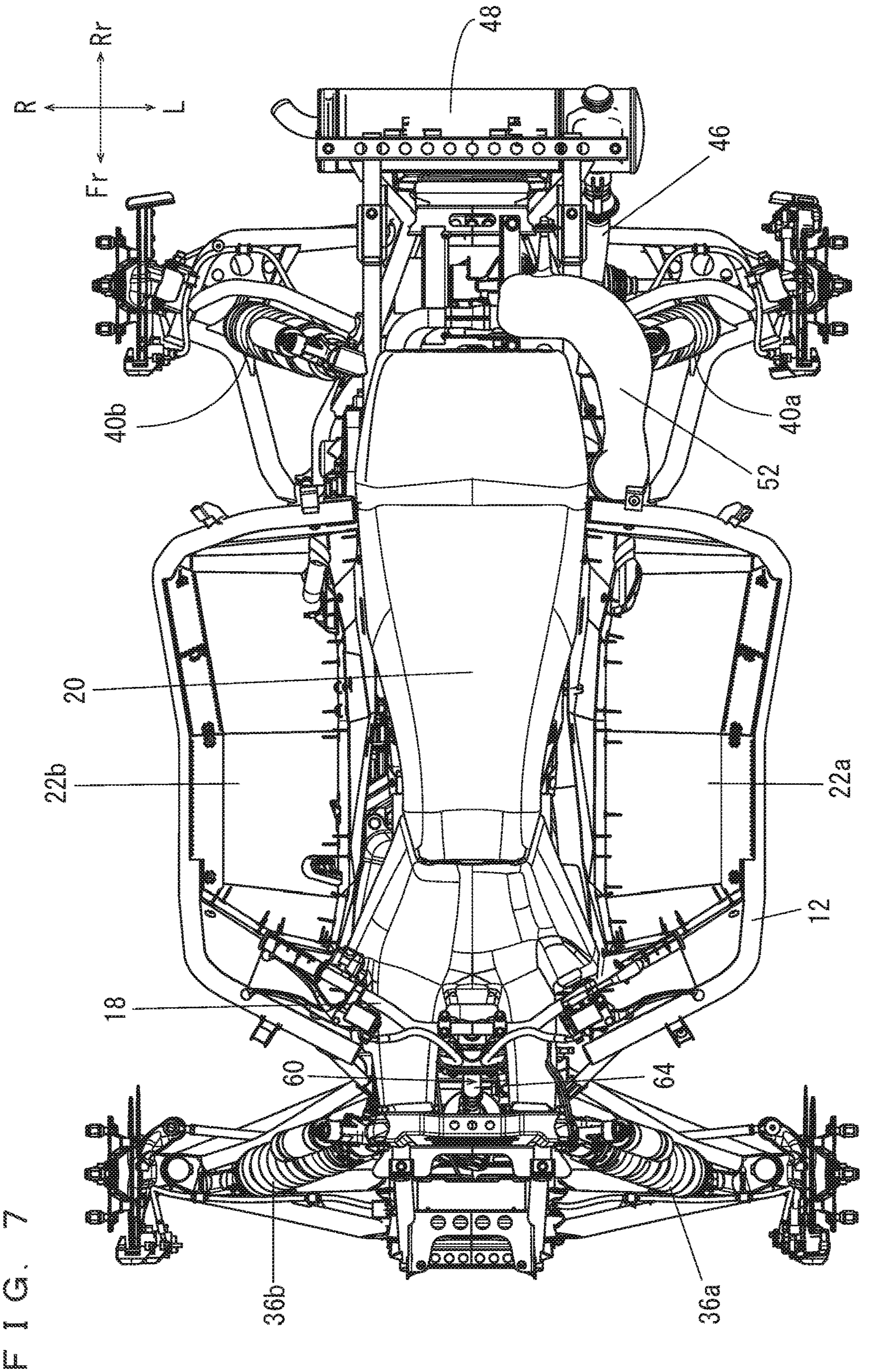
FIG. 7 is a plan view which shows a state where the wheels, the front fender, etc. are removed from the vehicle in FIG. 1.
Figure 8:
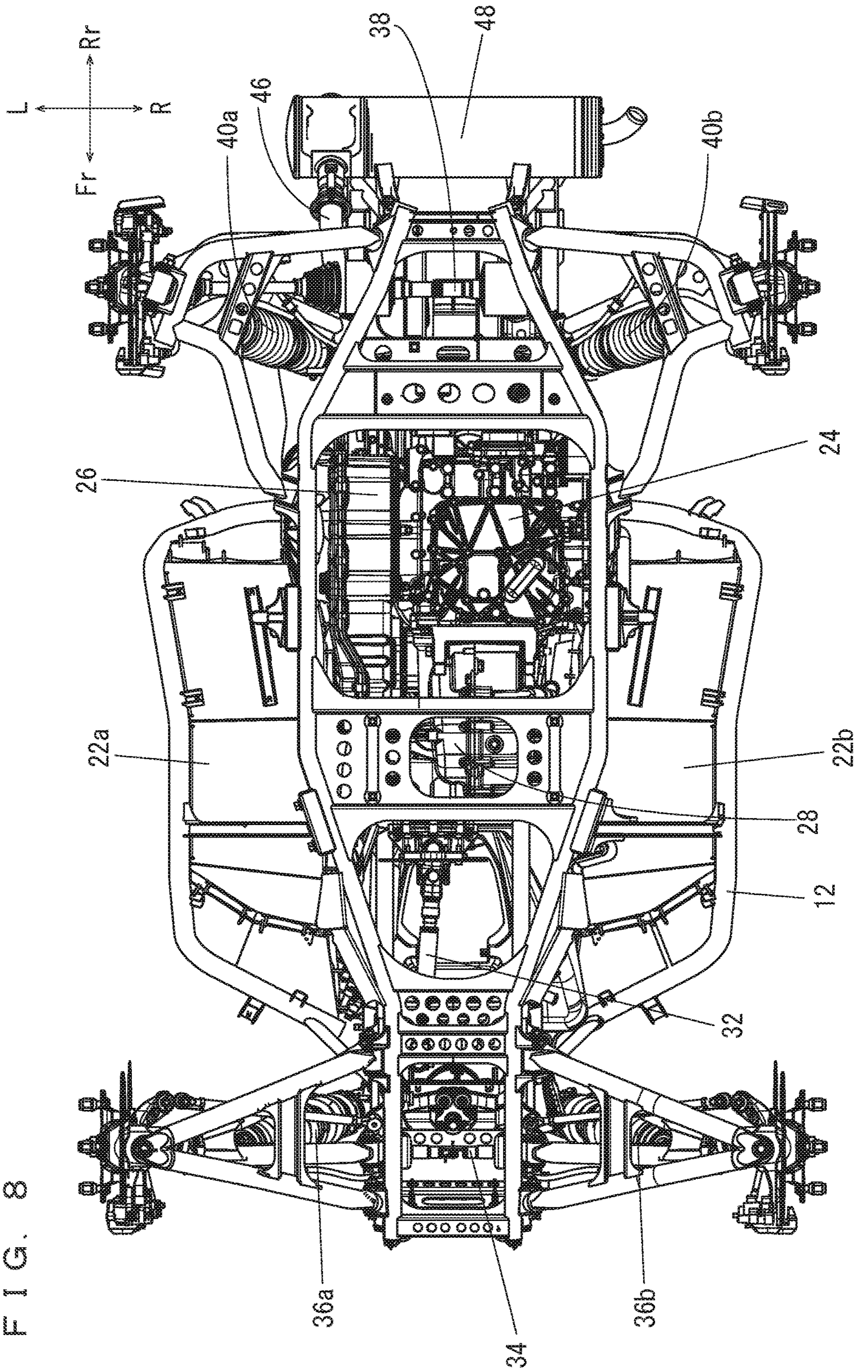
FIG. 8 is a bottom view which shows a state where the wheels, the front fender, etc. are removed from the vehicle in FIG. 1.
Figure 9:
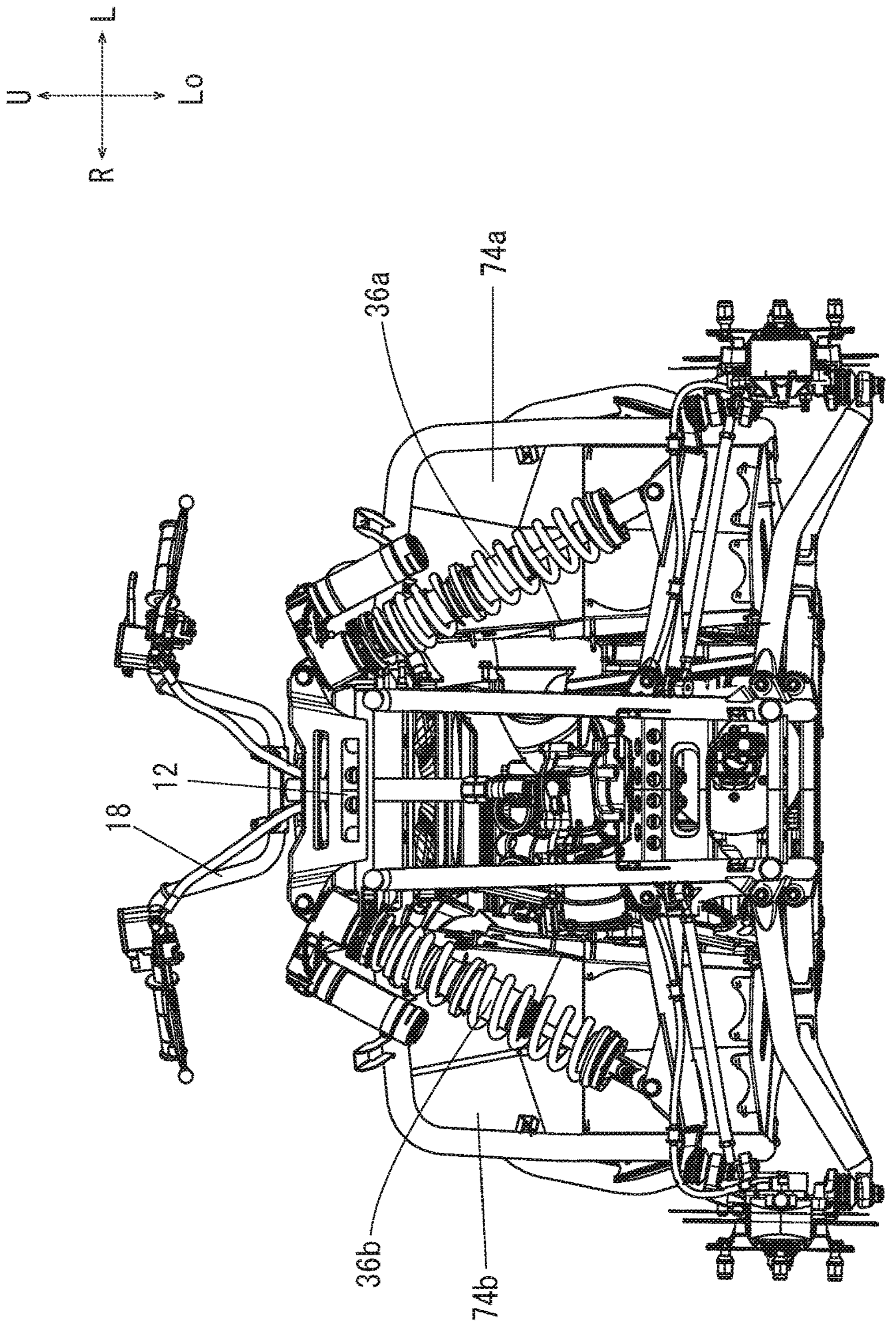
FIG. 9 is a front view which shows a state where the wheels, the front fender, etc. are removed from the vehicle in FIG. 1.
Figure 10:
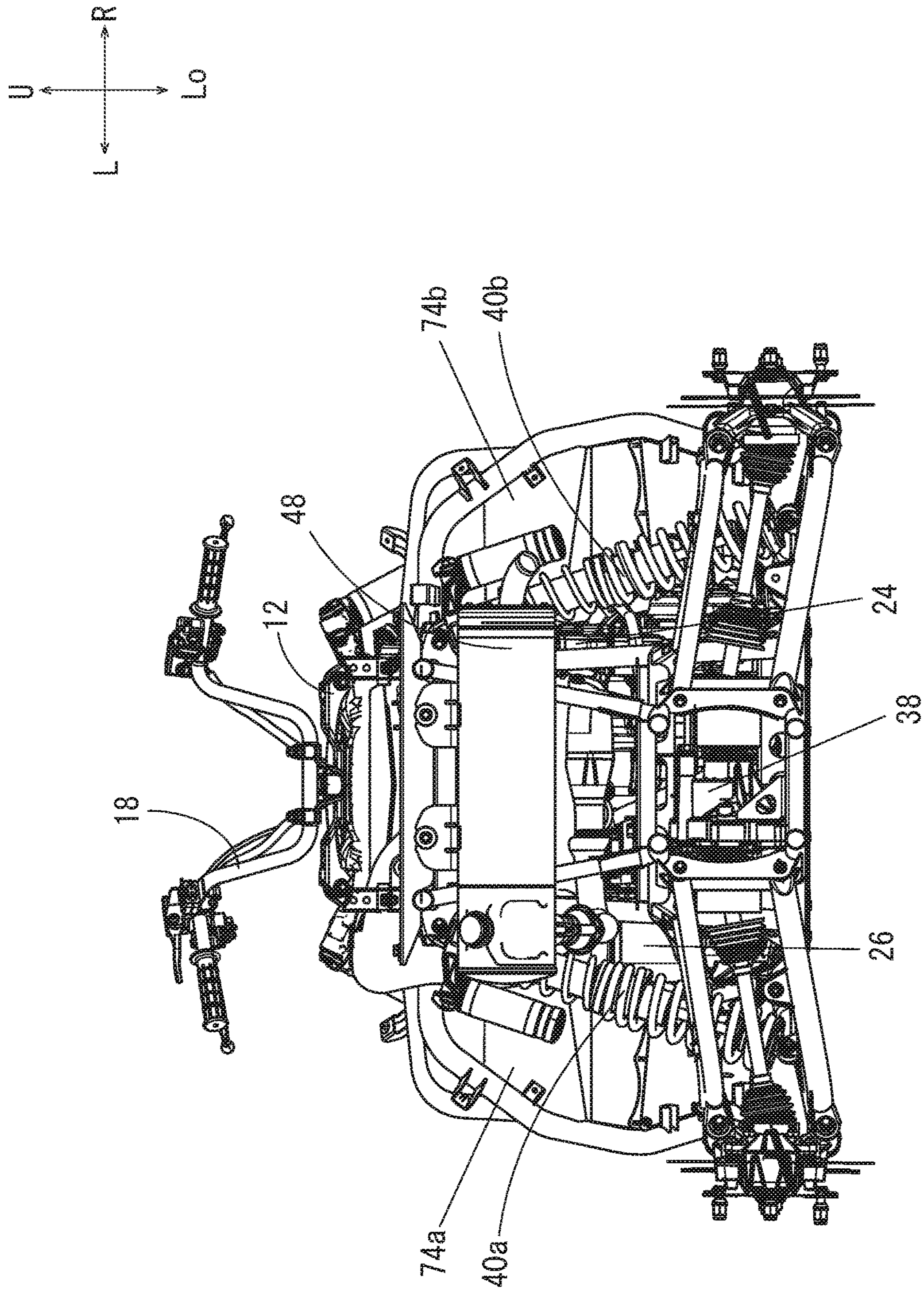
FIG. 10 is a rear view which shows a state where the wheels, the front fender, etc. are removed from the vehicle in FIG. 1.

Hereinafter, embodiments of the present invention will be described with reference to the drawings.

In the drawings, "Fr" indicates forward, "Rr" indicates rearward, "R" indicates rightward, "L" indicates leftward, "U" indicates upward and "Lo" indicates downward.

Referring to FIG. 1 through FIG. 5, a vehicle 10 according to an embodiment of the present invention is a straddled vehicle, and more specifically a four-wheeled ATV, which includes a body frame 12, a pair of front wheels 14*a*, 14*b*, a pair of rear wheels 16*a*, 16*b*, a bar handle 18, a saddle-style seat 20, and a pair of footrests 22*a*, 22*b*.

Referring also to FIG. 6 through FIG. 10, the pair of front wheels 14*a*, 14*b* are provided at a front portion of the body frame 12 via a pair of suspensions 36*a*, 36*b* (which will be described later). The pair of rear wheels 16*a*, 16*b* are provided at a rear portion of the body frame 12 via a pair of suspensions 40*a*, 40*b* (which will be described later). The bar handle 18 is provided in an intermediate region in the vehicle's width direction, connected at an upper portion of a steering shaft 64 (which will be described later), above the front wheels 14*a*, 14*b* in a side view. The seat 20 is provided at an intermediate portion in the vehicle's width direction, at a higher position than the front wheels 14*a*, 14*b* and the rear wheels 16*a*, 16*b*, between the front wheels 14*a*, 14*b* and the rear wheels 16*a*, 16*b* in a side view, and is supported by the body frame 12. The pair of footrests 22*a*, 22*b*, serving as places where the rider puts his/her respective feet, are provided in the body frame 12, disposed between the front wheels 14*a*, 14*b* and the rear wheels 16*a*, 16*b* in a side view.

Figure 11:
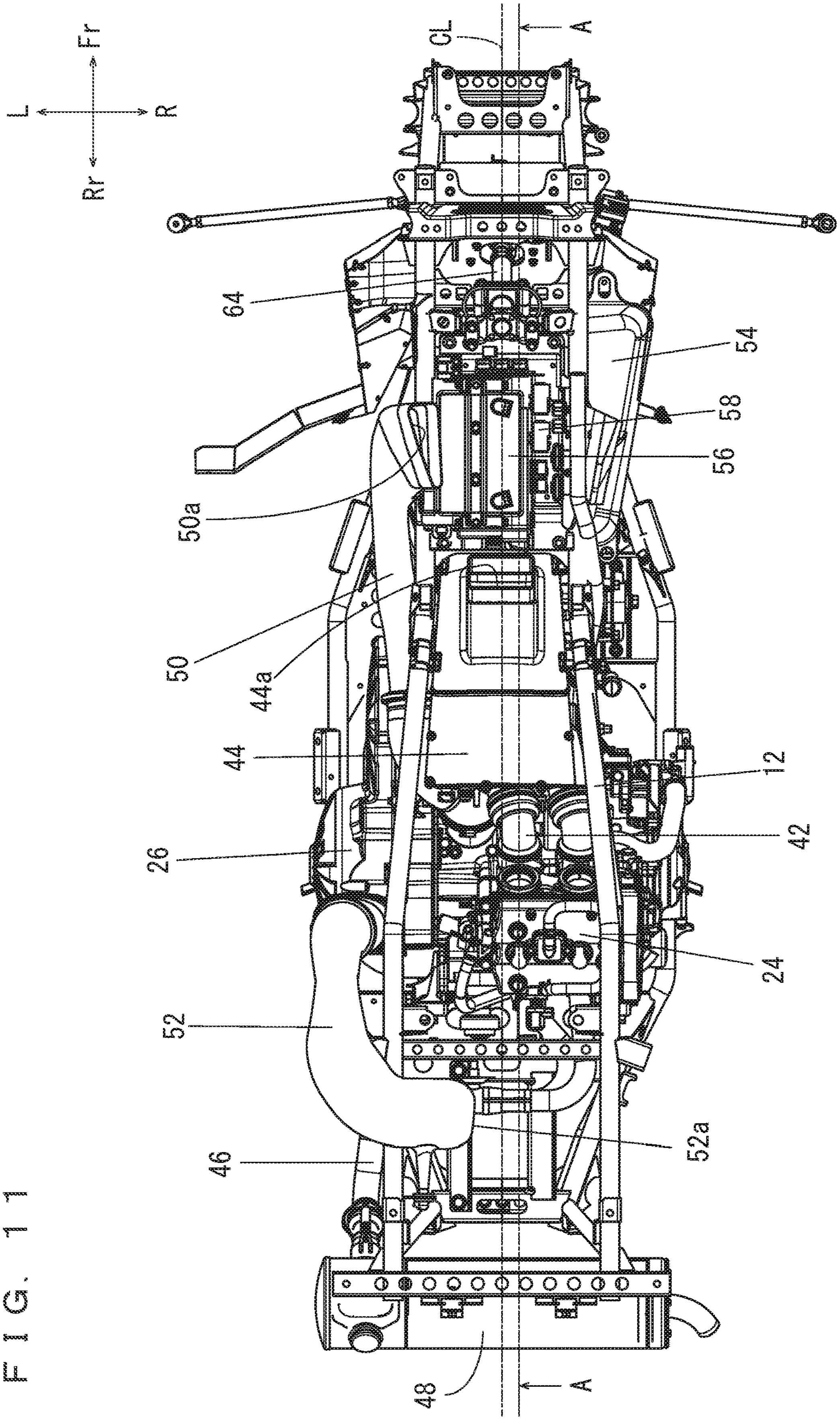
FIG. 11 is a plan view which shows an inside structure of the vehicle in FIG. 1.
Figure 12:
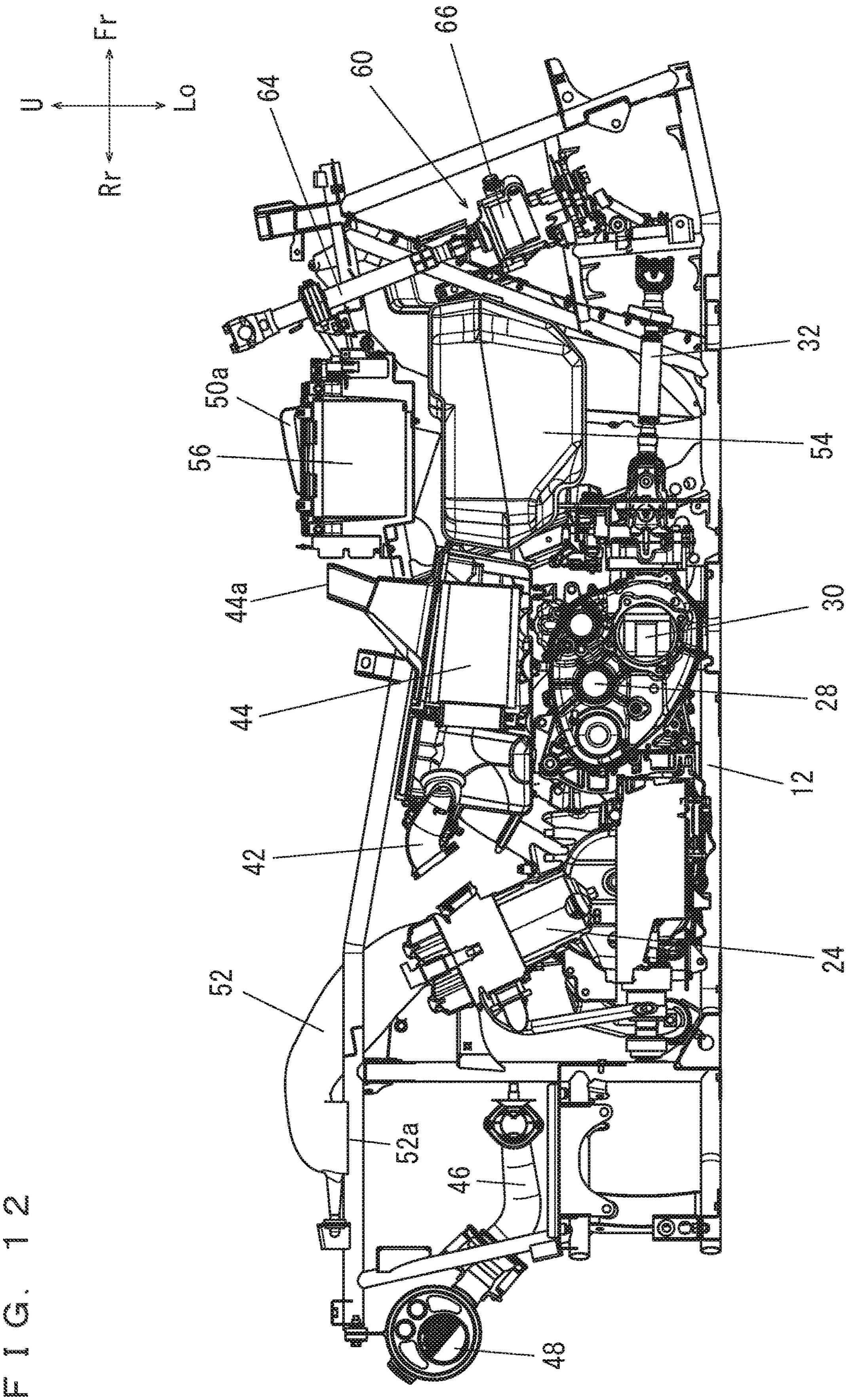
FIG. 12 is a sectional view taken in a line A-A in FIG. 11.

Referring to FIG. 11 and FIG. 12, the vehicle 10 further includes an engine 24 as a prime mover, a continuously variable transmission 26, and a transmission 28. The engine 24, the continuously variable transmission 26 and the transmission 28 are provided in the body frame 12.

In the present embodiment, the engine 24 is provided by a parallel two-cylinder engine. The engine 24 is disposed at a place slightly rearward than a center portion in a fore-aft direction of the body frame 12, with a rearward tilt. In other words, the engine 24 is laid in a rear-midship style. The continuously variable transmission 26, which receives an output from the engine 24, is provided on an outer side (left side in the present embodiment) of the engine 24. The transmission 28 is provided ahead of the engine 24 in order to speed-change an output from the continuously variable transmission 26. Therefore, the engine 24 and the transmission 28 are connected with each other via the continuously variable transmission 26.

The vehicle 10 further includes a propeller shaft 30 connected with the transmission 28 and extending in a fore-aft direction; a front shaft 32 connected with a front end portion of the propeller shaft 30 and extending in a fore-aft direction; a rotation transmission portion 34 (see FIG. 8) which transmits rotation coming from the transmission 28 via the propeller shaft 30 and the front shaft 32 to the pair of front wheels 14*a*, 14*b*; the pair of suspensions 36*a*, 36*b* which suspend the pair of front wheels 14*a*, 14*b*; a rear shaft (not illustrated) connected with a rear end portion of the propeller shaft 30 and extending in a fore-aft direction; a rotation transmission portion 38 which transmits rotation coming from the transmission 28 via the propeller shaft 30 and the rear shaft to the pair of rear wheels 16*a*, 16*b*; and the pair of suspensions 40*a*, 40*b* which suspend the pair of rear wheels 16*a*, 16*b*.

The rotation transmission portion 34 is connected with the engine 24 via the front shaft 32, the propeller shaft 30, the transmission 28 and the continuously variable transmission 26. The rotation transmission portion 38 is connected with the engine 24 via the rear shaft, the propeller shaft 30, the transmission 28 and the continuously variable transmission 26. Therefore, rotation of the engine 24 undergoes speed changes performed by the continuously variable transmission 26 and the transmission 28, and then is transmitted to the pair of front wheels 14*a*, 14*b* via the propeller shaft 30, the front shaft 32, and the rotation transmission portion 34. This rotates the pair of front wheels 14*a*, 14*b*. Also, rotation of the engine 24 undergoes speed changes performed by the continuously variable transmission 26 and the transmission 28, and then is transmitted to the pair of rear wheels 16*a*, 16*b* via the propeller shaft 30, the rear shaft, and the rotation transmission portion 38. This rotates the pair of rear wheels 16*a*, 16*b*.

The vehicle 10 further includes an air intake pipe 42 connected with the engine 24 in order to supply air into the engine 24, an air cleaner 44 connected with the air intake pipe 42, an exhaust pipe 46 connected with the engine 24 to discharge exhaust from the engine 24, and a muffler 48 connected with the exhaust pipe 46.

The air cleaner 44 is provided ahead of the engine 24 to overlap with the engine 24 in a front view, below the seat 20. The air cleaner 44 has an air intake port 44*a*. The air intake port 44*a* is provided so as to cross a centerline CL of the vehicle 10 in a plan view. Air from the air cleaner 44 is supplied to the engine 24 via the air intake pipe 42. The muffler 48 is provided behind the engine 24. The air intake pipe 42 is connected with a front portion of the engine 24. The exhaust pipe 46 is connected with a rear portion of the engine 24. Therefore, the engine 24 has a structure called front intake rear exhaust.

The vehicle 10 further includes an air intake duct 50 which is connected with the continuously variable transmission 26 for supplying air to the continuously variable transmission 26, and an exhaust duct 52 which is connected with the continuously variable transmission 26 in order to discharge exhaust from the continuously variable transmission 26.

The air intake duct 50 has an air intake port 50*a*. The exhaust duct 52 has an exhaust port 52*a*. In a plan view, the air intake port 50*a* is on the same side as the continuously variable transmission 26 with respect to a centerline CL of the vehicle 10, at a position more forward than a front end of the seat 20 in a plan view. The air intake port 50*a* of the air intake duct 50 is provided at a position higher than a battery 56 (which will be described later). The air intake duct 50 does not overlap with the engine 24 in a plan view. Air from the air intake duct 50 is supplied to the continuously variable transmission 26. The air intake port 50*a* of the air intake duct 50 and the air intake port 44*a* of the air cleaner 44 are provided at positions more rearward than the steering shaft 64. The air intake port 50*a* of the air intake duct 50 is disposed at a place covered by a top cover 68 (which will be described later). The air intake port 44*a* of the air cleaner 44 is disposed at a place covered by the seat 20.

The vehicle 10 further includes a fuel tank 54 which holds fuel to be supplied to the engine 24, and the battery 56 and an electric box 58 which are provided above the fuel tank 54.

The fuel tank 54 is provided at a position diagonally forward and upward of the transmission 28, ahead of the air cleaner 44. The battery 56 and the electric box 58 are provided side by side ahead of the seat 20.

Figure 13:
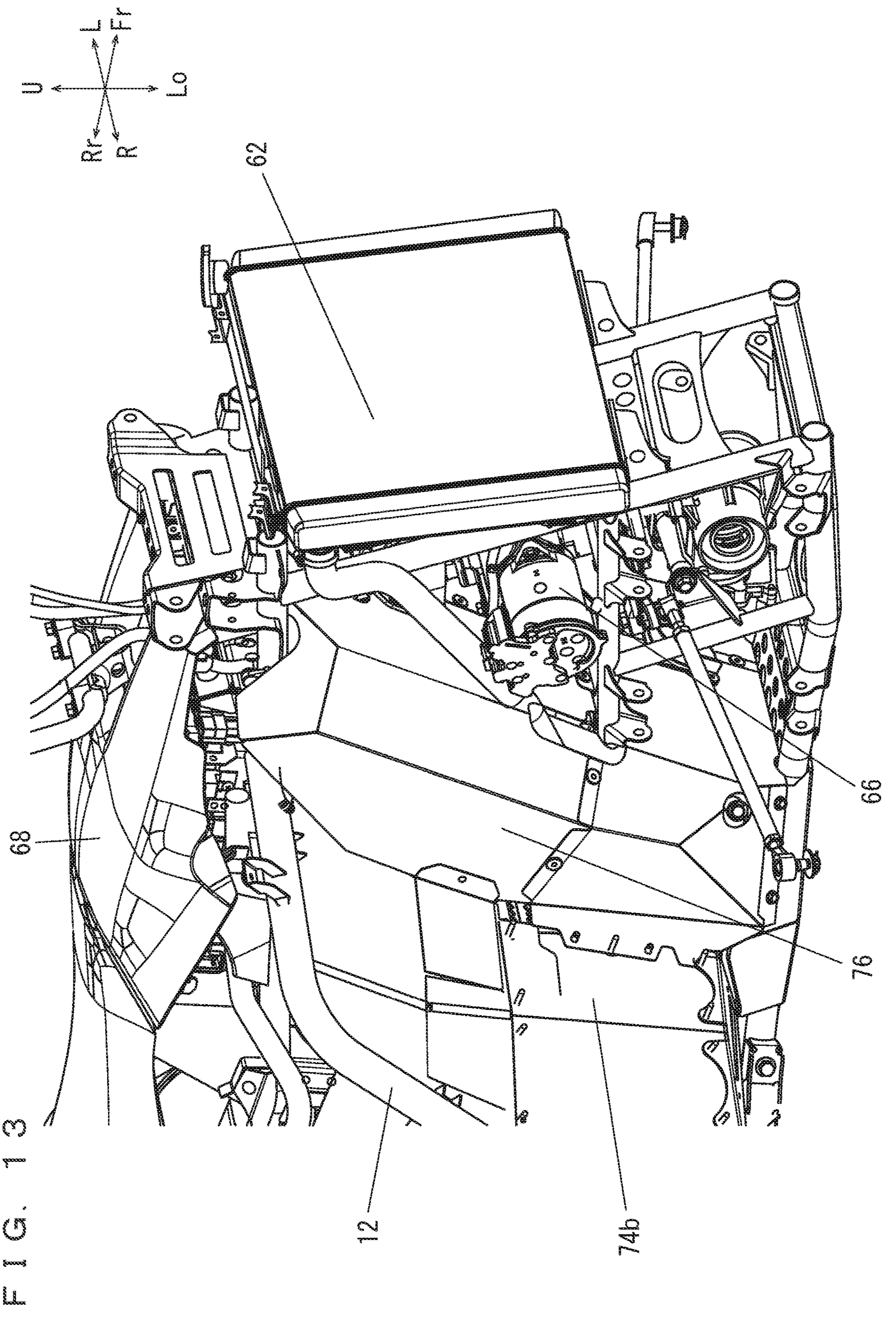
FIG. 13 is a perspective view which shows a windshield plate and surrounds thereof.
Figure 14:
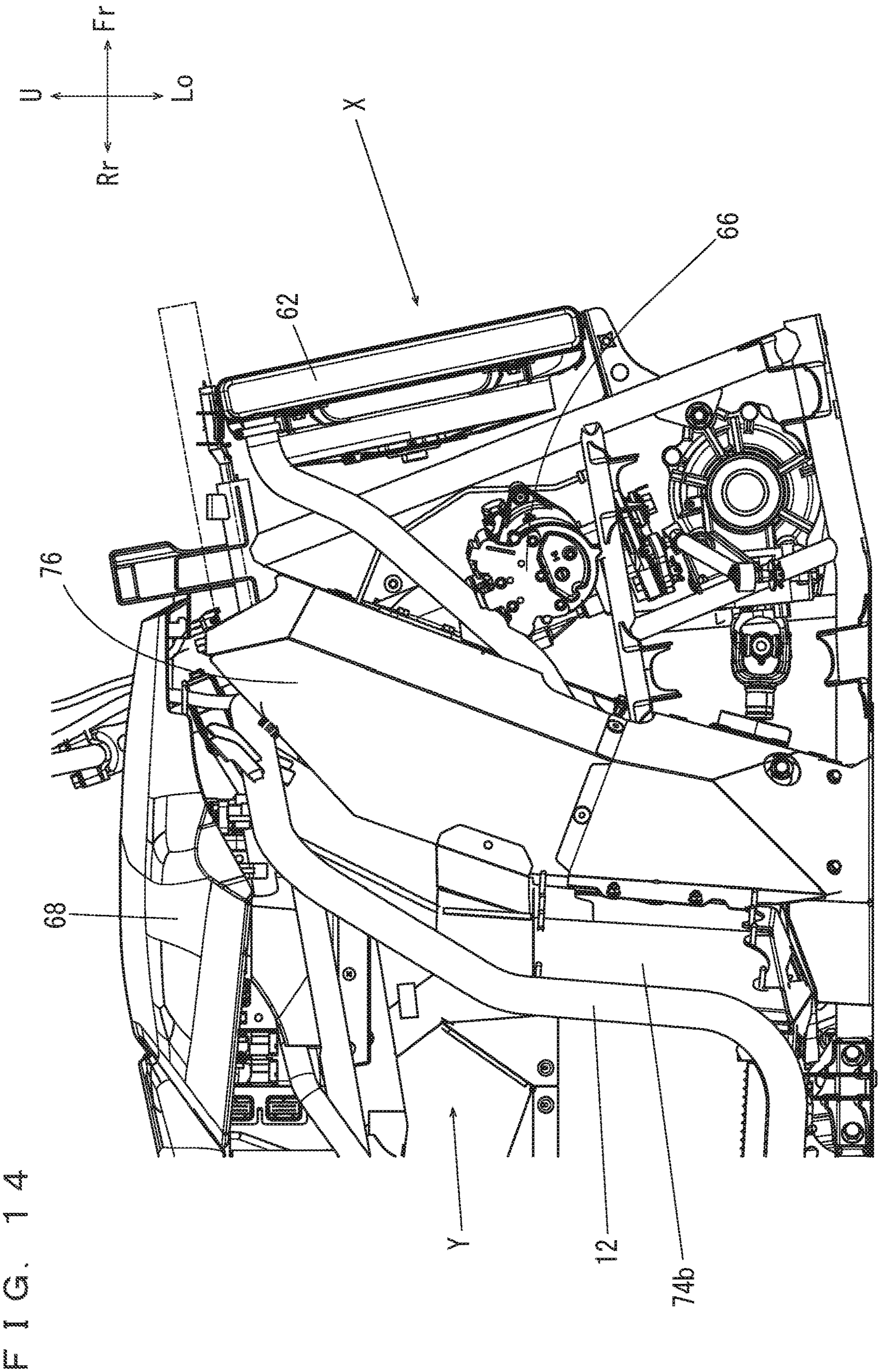
FIG. 14 is a side view which shows the windshield plate and surrounds thereof.
Figure 15:
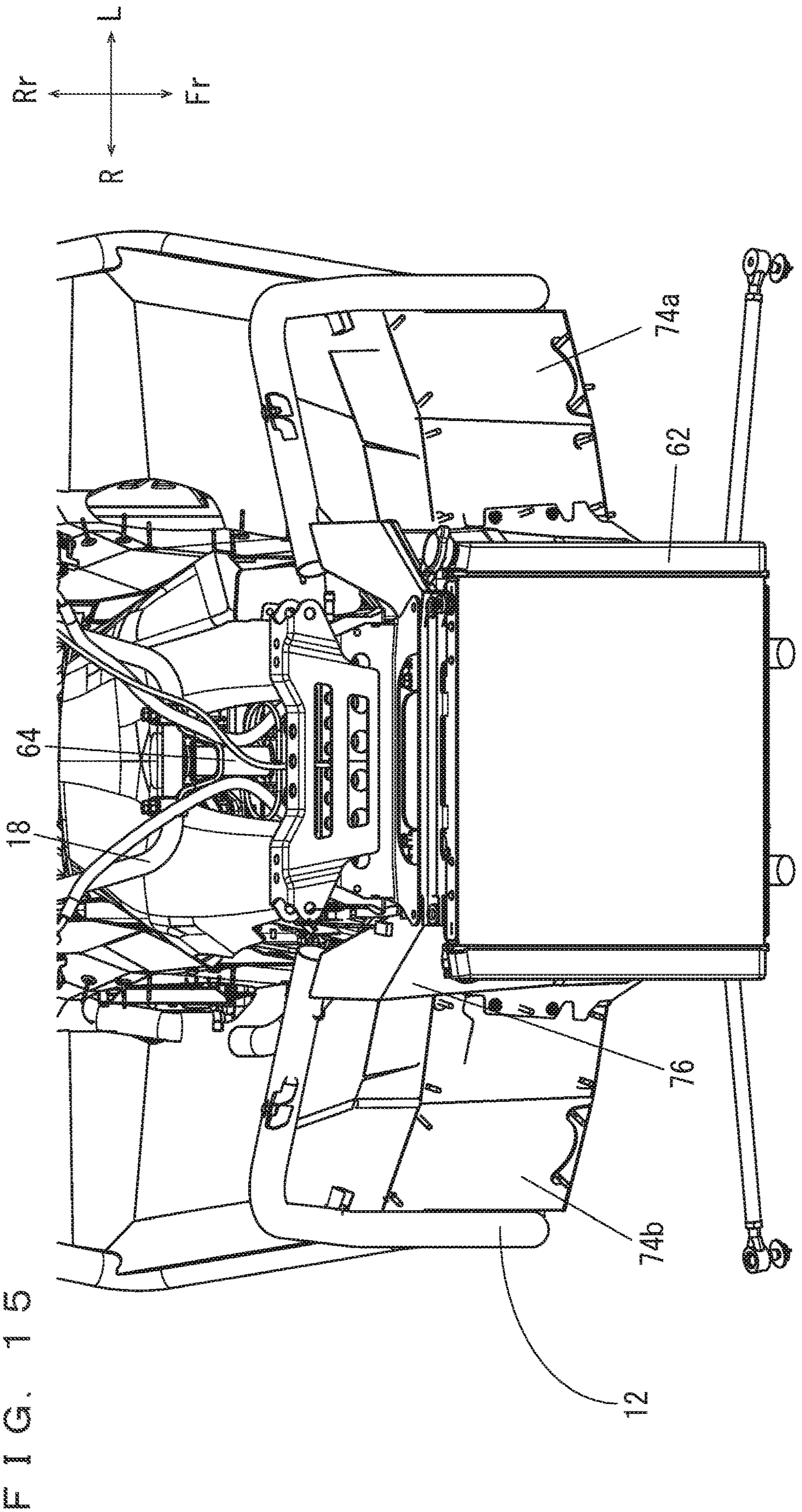
FIG. 15 is a perspective view which shows a front portion of the vehicle in FIG. 1.
Figure 16:
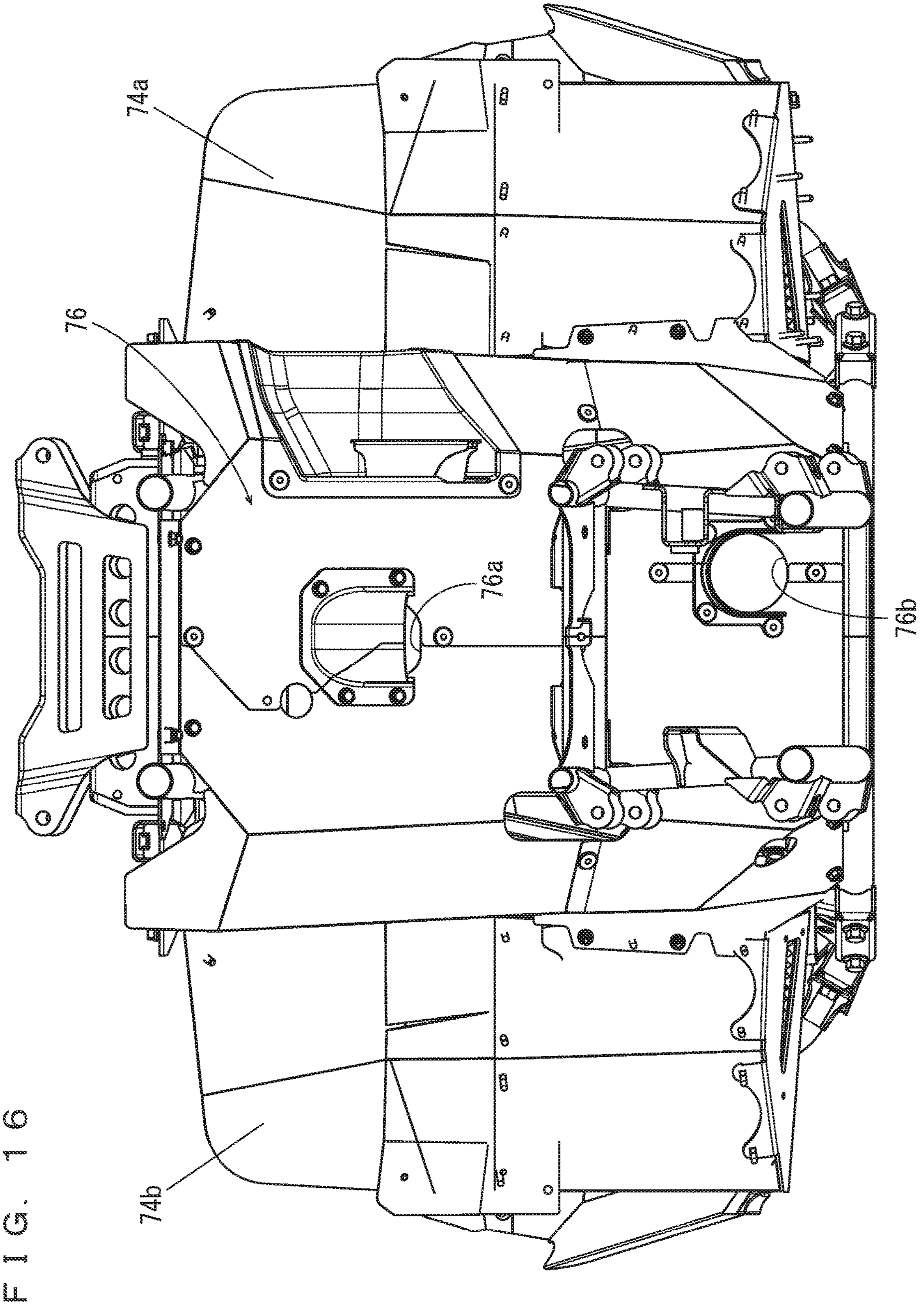
FIG. 16 is a front view which shows the windshield plate and a pair of fenders.

The vehicle 10 further includes a steering mechanism 60 for steering the pair of front wheels 14*a*, 14*b*, and a radiator 62 (see FIG. 13 though FIG. 15).

The steering mechanism 60 includes the steering shaft 64, and an electric power steering (EPS) 66 provided on the steering shaft 64. The steering shaft 64 is provided ahead of the seat 20. The electric power steering 66 is provided ahead of the fuel tank 54. The radiator 62 is provided at a position more forward than the steering shaft 64.

The vehicle 10 further includes the top cover 68, a front fender 70, a rear fender 72, a pair of fenders 74*a*, 74*b*, and a windshield plate 76.

Returning to FIG. 1 through FIG. 5, the top cover 68 is provided ahead of the seat 20. The front fender 70 is provided above the pair of front wheels 14*a*, 14*b*, striding over the pair of front wheels 14*a*, 14*b*, in a plan view. The rear fender 72 is provided above the pair of rear wheels 16*a*, 16*b*, striding over the pair of rear wheels 16*a*, 16*b*, in a plan view.

Referring also to FIG. 13 through FIG. 16, the pair of fenders 74*a*, 74*b* are provided behind the pair of front wheels 14*a*, 14*b* respectively and connected with each other by the windshield plate 76.

The windshield plate 76 is provided behind the radiator 62 to cover behind the radiator 62, extending in a width direction of the vehicle to partition between a radiator region X and an air intake port region Y from each other (i.e., to separate the radiator region X and the air intake port region Y). The radiator region X is an area ahead of the windshield plate 76 where the radiator 62 is placed. The air intake port region Y is an area behind the windshield plate 76 where the air intake ports 44*a*, 50*a* are placed. In other words, the windshield plate 76 is disposed between the radiator 62 and the air intake ports 44*a*, 50*a*. The windshield plate 76 has a first through-hole 76*a* for penetration by the steering shaft 64, and a second through-hole 76*b* for penetration by the front shaft 32 which is provided at a position lower than the steering shaft 64. In the present embodiment, the windshield plate 76 is composed of a plurality of parts.

In the present embodiment, the air cleaner 44 and the air intake duct 50 each represent the air intake portion. The front shaft 32 represents the drive shaft.

According to the vehicle 10 as has been described thus far, the windshield plate 76 penetrated by the steering shaft 64 partitions the radiator region X and the air intake port region Y from each other, whereby exhaust heat from the radiator 62 which is located at a position more forward than the steering shaft 64 is not transmitted to the air intake ports 44*a*, 50*a* which are located at positions more rearward than the steering shaft 64, and it is possible to reduce thermal effect on intake air temperatures caused by the exhaust heat from the radiator 62.

By having the windshield plate 76 composed of a plurality of parts, it becomes easy to assemble the windshield plate 76, and also possible to assemble the windshield plate 76 for improved air flow inside the air intake port region Y.

By connecting the pair of fenders 74*a*, 74*b* which are provided behind the pair of front wheels 14*a*, 14*b*, with each other using the windshield plate 76, it becomes possible to close a gap between the pair of fenders 74*a*, 74*b*.

The windshield plate 76 has the second through-hole 76*b* for penetration by the front shaft 32, and it is possible, with the windshield plate 76, to partition the radiator region X and the air intake port region Y from each other all the way down to below the front shaft 32. Therefore, it is possible to further reduce thermal effect on the intake air temperatures caused by the exhaust heat from the radiator 62.

It is possible, with the windshield plate 76, to reduce thermal effect caused by the exhaust heat from the radiator 62 on intake air temperatures of the engine 24 which represents the prime mover, and of the continuously variable transmission 26.

In the embodiment described above, the windshield plate 76 is provided to cover behind the radiator 62. However, the invention is not limited to this. For example, there may be an arrangement as shown in alternate long and short dash lines in FIG. 14, to further cover above the radiator 62. In other words, the windshield plate may be provided to cover above and behind the radiator 62. In this case, it becomes possible to further reduce the thermal effect caused by the exhaust heat from the radiator 62 on intake air temperatures.

In the embodiment described above, the prime mover is provided by the engine 24. However, the invention is not limited to this. The prime mover may be provided by a motor.

An air intake port for taking air into the vehicle 10 may be provided in a cover.

The present invention being thus far described in terms of preferred embodiments, it is obvious that these may be varied in many ways within the scope and the spirit of the present invention. The scope of the present invention is limited only by the accompanied claims.

The invention claimed is:

1. A vehicle comprising:

a pair of front wheels;

a pair of rear wheels;

a saddle-style seat positioned at an intermediate region in a width direction of the vehicle;

a steering shaft positioned ahead of the seat;

a radiator positioned more forward than the steering shaft;

an air intake portion having an air intake port, the air intake port being positioned more rearward than the steering shaft;

a windshield plate extending in the width direction of the vehicle, thereby separating a radiator region and an air intake port region, the windshield plate having a first through-hole through which the steering shaft penetrates; and a drive shaft provided at a lower position than the steering shaft and extending in a fore-aft direction of the vehicle, wherein the windshield plate further has a second through-hole through which the drive shaft penetrates.

2. The vehicle according to claim 1, wherein the windshield plate is composed of a plurality of parts.

3. The vehicle according to claim 1, further comprising a pair of fenders provided respectively behind the pair of front wheels, the pair of fenders being connected with each other by the windshield plate.

4. The vehicle according to claim 1, wherein the windshield plate is provided to cover the radiator from above and behind the radiator.

5. The vehicle according to claim 1, further comprising a prime mover configured to receive air from the air intake portion.

6. The vehicle according to claim 1, further comprising a continuously variable transmission configured to receive air from the air intake portion.

* * * * *